US012799259B2

(12) United States Patent
Wang et al.

(10) Patent No.: US 12,799,259 B2
(45) Date of Patent: Nov. 17, 2026

(54) BENZOXAZINE RESIN AND PREPARATION METHOD THEREOF, AND ADHESIVE

(71) Applicant: AAC Technologies (Nanjing) Co., Ltd., Nanjing (CN)

(72) Inventors: Hongyuan Wang, Shenzhen (CN); Yilan Zhang, Shenzhen (CN); Rui Pan, Shenzhen (CN); Hezhi Wang, Shenzhen (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 883 days.

(21) Appl. No.: 18/090,531

(22) Filed: Dec. 29, 2022

(65) Prior Publication Data

US 2024/0101746 A1 Mar. 28, 2024

Related U.S. Application Data

(63) Continuation of application No. PCT/CN2022/121715, filed on Sep. 27, 2022.

(30) Foreign Application Priority Data

Sep. 5, 2022 (CN) ......................... 202211080564.1

(51) Int. Cl.
*C08G 14/06* (2006.01)
*B32B 7/12* (2006.01)
(Continued)

(52) U.S. Cl.
CPC ................ *C08G 14/06* (2013.01); *B32B 7/12* (2013.01); *B32B 15/043* (2013.01); *B32B 15/20* (2013.01);
(Continued)

(58) Field of Classification Search
None
See application file for complete search history.

(56) References Cited

FOREIGN PATENT DOCUMENTS

CN 114805802 A * 7/2022 ......... C08G 73/1071
WO WO-2019189467 A1 * 10/2019 .............. C08L 79/04
(Continued)

OTHER PUBLICATIONS

Translation of CN-114805802-A (Year: NA).*
(Continued)

*Primary Examiner* — Rachel Kahn
(74) *Attorney, Agent, or Firm* — Wiersch Law Group

(57) ABSTRACT

This application provides a benzoxazine resin and a preparation method thereof, and an adhesive. The benzoxazine resin is represented by the following formula:

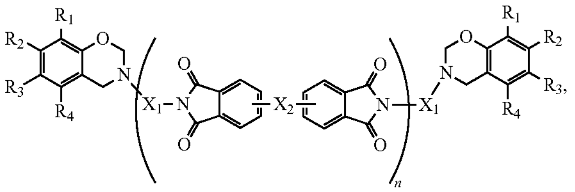

where $R_1$, $R_2$, $R_3$ and $R_4$ are each independently selected from the group consisting of —H, alkyl, alkoxy, cycloalkyl, and aryl, and at least one of $R_1$, $R_2$, $R_3$ and $R_4$ is —H; $X_1$ is an alkyl or/and alkoxy containing a long chain structure in main chain or side chain; $X_2$ is one or more selected from alkyl, ether group, alkoxy, alkyl ester group, carbonyl, sulfone group, and thioether group; and n is 1-150.

11 Claims, 2 Drawing Sheets

(51) Int. Cl.
*B32B 15/04* (2006.01)
*B32B 15/20* (2006.01)
*C08G 73/10* (2006.01)
*C09J 161/14* (2006.01)

(52) U.S. Cl.
CPC ..... *C08G 73/1032* (2013.01); *C08G 73/1082* (2013.01); *C09J 161/14* (2013.01); *B32B 2311/12* (2013.01); *B32B 2457/08* (2013.01); *C08G 2170/00* (2013.01); *C09J 2400/163* (2013.01); *C09J 2461/00* (2013.01)

(56) References Cited

FOREIGN PATENT DOCUMENTS

WO WO-2020215027 A1 * 10/2020 ........... C08G 73/122
WO WO-2021198793 A1 * 10/2021 ............. C08G 73/06

OTHER PUBLICATIONS

Susa et al.(Understanding the Effect of the Dianhydride Structure on the Properties of Semiaromatic Polyimides Containing a Biobased Fatty Diamine, ACS Sustainable Chem. Eng. 2018, 6, 668-678). (Year: 2018).*
Translation of WO-2019189467-A1 (Year: NA).*

* cited by examiner

BENZOXAZINE RESIN AND PREPARATION METHOD THEREOF, AND ADHESIVE

TECHNICAL FIELD

The present application relates to electronic adhesives, and more particularly to a benzoxazine resin and a preparation method thereof, and an adhesive.

BACKGROUND

With the development of information technology, the electronic transmission has been developed in the tendency of high frequency and high speed, and a multi-functional, multi-density and multi-level electronic product is appreciated in the future. Flexible printed circuit boards have been increasingly used in electronic devices, and the challenge posed to their performance is growing.

In the related technology, a dual-hydroxy-substituted phthalimide monomer, an aldehyde and a primary amine are usually used as reactants to synthesize a benzoxazine intermediate containing the phthalimide structure, which is further converted to a benzoxazine resins containing an imide group. Although this resin has good thermal resistance, the bending resistance and dielectric property of the cured product are poor, and thus this resin cannot meet the requirements of flexible copper clad laminates in bending strength. Moreover, an adhesive material composed of one or more of polyisocyanate, melamine and a silane-modified epoxy resin can be selected, which has a low dielectric constant and low dielectric loss tangent, as well as good thermal resistance. However, this product has high curing temperature, which will easily cause oxidation of copper foil during the fabrication of copper clad laminates. Moreover, the curing process of the isocyanate and anhydride will generate carbon dioxide, which will lead to the occurrence of defects such as air holes after the product is cured, thereby leading to delamination during the tin soldering.

Therefore, it is necessary to provide a novel benzoxazine resin and a preparation method thereof, and an adhesive to address the above technical problems.

SUMMARY

An object of the present application is to provide a benzoxazine resin to solve the problem that the adhesive materials composed of the existing benzoxazine resins can no longer meet the needs of new high-frequency flexible copper clad laminates.

In a first aspect, this application provides a benzoxazine resin having the following molecular formula:

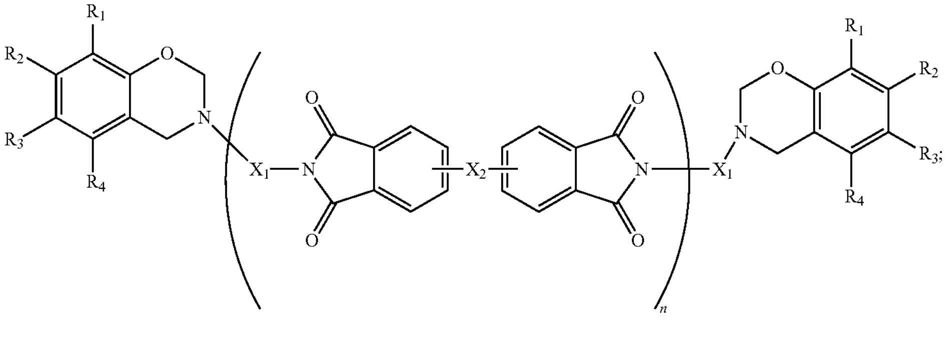

wherein $R_1$, $R_2$, $R_3$ and $R_4$ are each independently selected from the group consisting of —H, alkyl, alkoxy, cycloalkyl, and aryl, and at least one of $R_1$, $R_2$, $R_3$ and $R_4$ is —H; $X_1$ is an alkyl or/and alkoxy containing a long chain structure in main chain or side chain; $X_2$ is one or more selected from alkyl, ether group, alkoxy, alkyl ester group, carbonyl, sulfone group, and thioether group; and n is 1-150.

In an embodiment, n is 20-100.

In an embodiment, the number of carbon atoms in the alkyl and the alkoxy is 5-30.

In a second aspect, this application further provides a method for preparing the benzoxazine resin, comprising:

subjecting a primary amine-capped flexible polyimide oligomer, an aldehyde and a monofunctional phenolic compound to reaction to synthesize the benzoxazine resin.

In an embodiment, the primary amine-capped flexible polyimide oligomer is a reaction product of a tetracarboxylic acid dianhydride and a dibasic primary amine; and the dibasic primary amine is a diamine containing a flexible long chain in main chain or side chain or a mixture thereof with an aromatic diamine.

In an embodiment, the aldehyde is formaldehyde, paraformaldehyde or a mixture thereof.

In an embodiment, a molecular formula of the monofunctional phenolic compound is shown as follows:

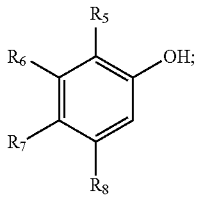

wherein $R_5$, $R_6$, $R_7$ and $R_8$ are each independently selected from the group consisting of —H, alkyl, alkoxy, cycloalkyl, and aryl, and at least one of $R_5$, $R_6$, $R_7$ and $R_8$ is —H.

In an embodiment, the number of carbon atoms in the alkyl and the cycloalkyl is 1-10.

In an embodiment, a molar ratio of the primary amine-capped flexible polyimide oligomer to the aldehyde to the monofunctional phenolic compound is (0.8-1.2):(1.6-2.5):(0.9-1.3).

In an embodiment, the reaction is performed in a solvent; and the solvent is selected from the group consisting of toluene, xylene, dioxane, tetrahydrofuran, methanol, ethanol, acetone, butanone, cyclohexanone, N,N-dimethylformamide, N,N-dimethylacetamide, N-methylpyrrolidone and a combination thereof.

In an embodiment, the reaction is performed at 60-180 °C for 0.5-10 h.

In an embodiment, the primary amine-capped flexible polyimide oligomer is prepared through steps of:

(S1) dissolving the dibasic primary amine in the solvent under the protection of nitrogen to obtain a first mixture;

(S2) stepwise adding the tetracarboxylic acid dianhydride to the first mixture;

(S3) performing reaction at a first preset temperature for a first preset time to obtain a second mixture; and (S4) adding a catalyst or a water-carrying agent to the second mixture followed by imidization at a second preset temperature for a second preset time and precipitation or drying to obtain the primary amine-capped flexible polyimide oligomer.

In an embodiment, a molar ratio of the dibasic primary amine to the tetracarboxylic acid dianhydride is greater than or equal to 1 and less than 1.1.

In an embodiment, the first preset temperature is −20~30 °C, and the first preset time is 0.5-24 h.

In an embodiment, the tetracarboxylic acid dianhydride is selected from the group consisting of 3,3',4,4'-biphenyltetracarboxylic dianhydride, 4,4'-oxydiphthalic anhydride, 3,3',4,4'-benzophenonetetracarboxylic dianhydride, 4,4'-(hexafluoroisopropylidene)diphthalic anhydride, 4,4'-(4,4'-isopropylidenediphenoxy)bis(phthalic anhydride), 1,2,4,5-benzenetetracarboxylic anhydride and a combination thereof.

In an embodiment, a molecular formula of the diamine containing a flexible long chain in main chain or side chain is shown as follows:

$H_2N—X_3—NH_2$;

wherein $X_3$ is an alkyl or/and alkoxy containing a long chain structure in main chain or side chain; and the aromatic diamine is selected from the group consisting of m-phenylenediamine, 4,4'-diaminodiphenyl ether, p-phenylenediamine, 1,3-bis(3-aminophenoxy)benzene, 1,3-bis(4-aminophenoxy)benzene, 1,4-bis(4-aminophenoxy)benzene and a combination thereof.

In an embodiment, a molar ratio of the diamine containing a flexible long chain in main chain or side chain to the aromatic diamine is (2:8)-(10:0).

In an embodiment, the primary amine-capped flexible polyimide oligomer has a number-average molecular weight of 1,000-100,000.

In a third aspect, this application further provides an adhesive, comprising:

a benzoxazine resin prepared by any one of the above-mentioned methods.

In an embodiment, the adhesive is applied to film adhesive materials, adhesive layers, adhesive sheets, resin-coated copper foils, copper-clad laminates and multi-layer resin substrates.

Compared to the prior art, the present application has the following beneficial effects. The benzoxazine resin provided herein is synthesized through reaction of a primary amine-capped flexible polyimide oligomer, an aldehyde and a monofunctional phenolic compound, and has a flexible polyimide long chain in the main chain. Considering that the benzoxazine resin will undergo ring-opening polymerization under heating, and its curing process will not lead to the release of small molecules, the benzoxazine resin can be cured into an adhesive which has low dielectric constant and dielectric loss, and can meet the requirements of high-frequency flexible copper clad laminates for adhesion property and soldering resistance. Therefore, the adhesive material composed of the benzoxazine resin provided herein can satisfy the needs of high-frequency flexible copper clad laminates.

BRIEF DESCRIPTION OF THE DRAWINGS

The drawings needed in the description of the embodiments of the disclosure will be briefly described below to explain the technical solutions in the embodiments of the disclosure more clearly. Obviously, presented in the drawings are merely some embodiments of the disclosure, and those skilled in the art can obtain other drawings based on the drawings provided herein without paying creative effort.

DETAILED DESCRIPTION OF THE EMBODIMENTS

Figure 1:
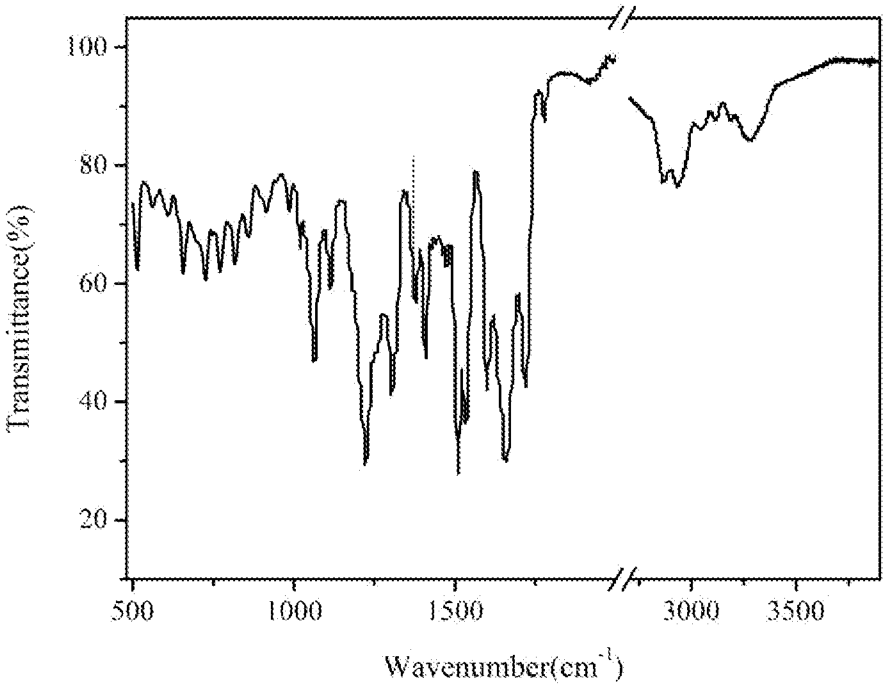
FIG. 1 illustrates an infrared spectrogram of a benzoxazine resin prepared in Example 4 of the present application.

The present application will be further described below with reference to the accompanying drawings and embodiments to make objects, technical solutions, and advantages of the present application clearer. It should be understood that these embodiments are merely illustrative of the present application, and are not intended to limit the present application.

Example 1

This example provides a benzoxazine resin represented by the following molecular formula:

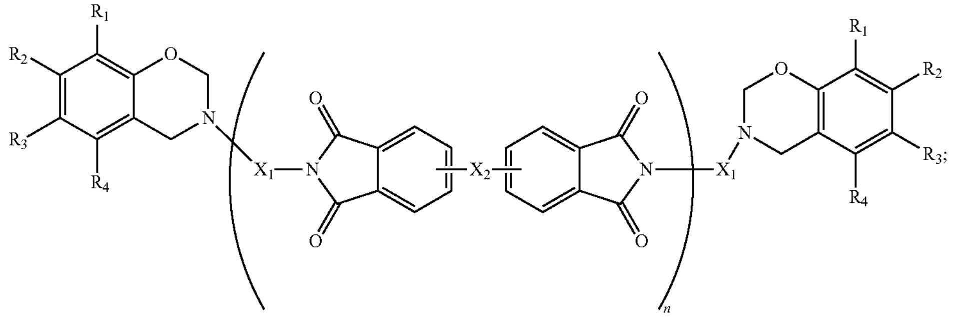

where $R_1$, $R_2$, $R_3$ and $R_4$ are each independently selected from the group consisting of —H, alkyl, alkoxy, cycloalkyl, and aryl, and at least one of $R_1$, $R_2$, $R_3$ and $R_4$ is —H; $X_1$ is an alkyl or/and alkoxy containing a long chain structure in main chain or side chain; $X_2$ is one or more selected from alkyl, ether group, alkoxy, alkyl ester group, carbonyl, sulfone group, and thioether group; and n is 1-150.

Specifically, n is 20-100.

Specifically, the number of carbon atoms in the alkyl and the alkoxy is 5-30.

Example 2

This example provides a method for preparing a benzoxazine resin, including:

subjecting a primary amine-capped flexible polyimide oligomer, an aldehyde and a monofunctional phenolic compound to reaction to synthesize the benzoxazine resin containing an imide structure in the main chain. Considering that the benzoxazine resin will undergo ring-opening polymerization under heating, and its curing process will not lead to the release of small molecules, the benzoxazine resin can be cured into an adhesive which has low dielectric constant and dielectric loss, and can meet the requirements of high-frequency flexible copper clad laminates for adhesion property and soldering resistance.

Specifically, the primary amine-capped flexible polyimide oligomer is a reaction product of a tetracarboxylic acid dianhydride and a dibasic primary amine; and the dibasic primary amine is a diamine containing a flexible long chain in main chain or side chain or a mixture thereof with an aromatic diamine.

Specifically, the aldehyde is formaldehyde, paraformaldehyde or a mixture thereof.

Specifically, a molecular formula of the monofunctional phenolic compound is shown as follows:

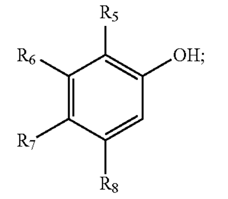

where $R_5$, $R_6$, $R_7$ and $R_8$ are each independently selected from the group consisting of —H, alkyl, alkoxy, cycloalkyl, and aryl, and at least one of $R_5$, $R_6$, $R_7$ and $R_8$ is —H.

Specifically, the number of carbon atoms in the alkyl and the cycloalkyl is 1-10; and the aryl is phenyl or alkyl-substituted phenyl. In an embodiment, the monofunctional phenolic compound is phenol, p-methylphenol, m-methylphenol, or p-ethylphenol, Specifically, a molar ratio of the primary amine-capped flexible polyimide oligomer to the aldehyde to the monofunctional phenolic compound is (0.8-1.2):(1.6-2.5):(0.9-1.3).

In this example, the reaction is performed in a solvent, where the solvent is selected from the group consisting of toluene, xylene, dioxane, tetrahydrofuran, methanol, ethanol, acetone, butanone, cyclohexanone, N,N-dimethylformamide, N,N-dimethylacetamide, N-methylpyrrolidone and a combination thereof.

Specifically, the reaction is performed at 60-180 °C for 0.5-10 h.

In this example, the primary amine-capped flexible polyimide oligomer is prepared through steps of:

(S1) dissolving the dibasic primary amine in the solvent under the protection of nitrogen to obtain a first mixture;

(S2) stepwise adding the tetracarboxylic acid dianhydride to the first mixture;

(S3) performing reaction at a first preset temperature for a first preset time to obtain a second mixture; and (S4) adding a catalyst or a water-carrying agent to the second mixture followed by imidization at a second preset temperature for a second preset time and precipitation or drying to obtain the primary amine-capped flexible polyimide oligomer.

The second preset temperature and the second preset time are set according to the selected compounds. Specifically, the second preset temperature is −20~30 °C, preferably 20 °C; and the second preset time is 0.5-24 h, preferably 15 h.

In this example, a molar ratio of the dibasic primary amine to the tetracarboxylic acid dianhydride is greater than or equal to 1 and less than 1.1

Specifically, the first preset temperature and the first preset time are set according to the selected compounds, and are not specifically limited herein. Certainly, according to the actual requirement, the first preset temperature is −20~30 °C, preferably 10 °C; and the first preset time is 0.5-24 h, preferably 12 h.

Specifically, the tetracarboxylic acid dianhydride is selected from the group consisting of 3,3',4,4'-biphenyltetracarboxylic dianhydride (BPDA), 4,4'-oxydiphthalic anhydride (ODPA), 3,3',4,4'-benzophenonetetracarboxylic dianhydride (BTDA), 4,4'-(hexafluoroisopropylidene)diphthalic anhydride (6FDA), 4,4'-(4,4'-isopropylidenediphenoxy)bis (phthalic anhydride) (BPADA), 1,2,4,5-benzenetetracarboxylic anhydride (PMDA) and a combination thereof.

Specifically, a molecular formula of the diamine containing a flexible long chain in main chain or side chain is shown as follows:

$H_2N—X_3—NH_2$;

where $X_3$ is an alkyl or/and alkoxy containing a long chain structure in main chain or side chain; and the aromatic diamine is selected from the group consisting of m-phenylenediamine, 4,4'-diaminodiphenyl ether, p-phenylenediamine, 1,3-bis(3-aminophenoxy)benzene, 1,3-bis(4-aminophenoxy)benzene, 1,4-bis(4-aminophenoxy)benzene and a combination thereof.

Specifically, a molar ratio of the diamine containing a flexible long chain in main chain or side chain to the aromatic diamine is (2:8)-(10:0).

Specifically, the primary amine-capped flexible polyimide oligomer has a number-average molecular weight of 1,000-100,000.

Compared to the prior art, the benzoxazine resin provided herein is synthesized through reaction of a primary amine-capped flexible polyimide oligomer, an aldehyde and a monofunctional phenolic compound, and has a flexible polyimide long chain in the main chain. Considering that the benzoxazine resin will undergo ring-opening polymerization under heating, and its curing process will not lead to the release of small molecules, the benzoxazine resin can be cured into an adhesive which has low dielectric constant and dielectric loss, and can meet the requirements of high-frequency flexible copper clad laminates for adhesion property and soldering resistance. Therefore, the adhesive material composed of the benzoxazine resin provided herein can satisfy the needs of high-frequency flexible copper clad laminates.

Example 3

This example provides an adhesive, which includes the benzoxazine resin prepared by the method in Example 2.

In this example, the adhesive is applied to film adhesive materials, adhesive layers, adhesive sheets, resin-coated copper foils, copper-clad laminates and multi-layer resin substrates.

Since the adhesive in this example includes the benzoxazine resin prepared in Example 2, it can meet the performance requirements of high-frequency flexible copper clad laminates for adhesive materials when applied to the high-frequency flexible copper clad laminates.

Example 4

Provided herein was a method for preparing the benzoxazine resin. Specifically, under the protection of nitrogen ($N_2$), 8.4 g of polyetheramine D400 was dissolved with 44.01 g of N-methylpyrrolidone in a single-necked flask equipped with a magnetic stirrer and a water separation device, to which 10.46 g of 4,4'-(4,4'-isopropylidenediphenoxy)bis(phthalic anhydride) (BPADA) was slowly added. The reaction mixture was reacted at room temperature for 1 h, and then reacted at 140 °C for 10 h to obtain a primary amine-capped flexible polyimide oligomer solution. After cooled, the single-necked flask was added with 0.095 g of phenol, 0.06 g of paraformaldehyde and 0.36 g of toluene, and the water separation device was replaced with a condenser. The reaction mixture was heated to 90 °C and refluxed for 6 h. After the reaction was completed, a yellow transparent liquid with 30% solid content was collected as the benzoxazine resin.

Example 5

Provided herein was a method for preparing the benzoxazine resin. Specifically, under the protection of nitrogen ($N_2$), 6.8 g of polyetheramine D400 and 0.8 g of 4,4'-diaminodiphenyl ether (ODA) were dissolved with 42.15 g of N-methylpyrrolidone in a single-necked flask equipped with a magnetic stirrer and a water separation device, to which 10.46 g of 4,4'-(4,4'-isopropylidenediphenoxy)bis (phthalic anhydride) (BPADA) was slowly added. The reaction mixture was reacted at room temperature for 1 h, and then reacted at 140 °C for 10 h to obtain a primary amine-capped flexible polyimide oligomer solution. After cooled, the single-necked flask was added with 0.095 g of phenol, 0.06 g of paraformaldehyde and 0.36 g of toluene, and the water separation device was replaced with a condenser. The reaction mixture was heated to 90 °C and refluxed for 6 h. After the reaction was completed, a yellow transparent liquid with 30% solid content was collected as the benzoxazine resin.

Example 6

Provided herein was a method for preparing the benzoxazine resin. Specifically, under the protection of nitrogen ($N_2$), 4.83 g of polyetheramine D230 was dissolved with 35.68 g of N-methylpyrrolidone in a single-necked flask equipped with a magnetic stirrer and a water separation device, to which 10.46 g of 4,4'-(4,4'-isopropylidenediphenoxy)bis(phthalic anhydride) (BPADA) was slowly added. The reaction mixture was reacted at room temperature for 1 h, and then reacted at 140 °C for 10 h to obtain a primary amine-capped flexible polyimide oligomer solution. After cooled, the single-necked flask was added with 0.095 g of phenol, 0.06 g of paraformaldehyde and 0.36 g of toluene, and the water separation device was replaced with a condenser. The reaction mixture was heated to 90 °C and refluxed for 6 h. After the reaction was completed, a yellow transparent liquid with 30% solid content was collected as the benzoxazine resin.

Example 7

Provided herein was a method for preparing the benzoxazine resin. Specifically, under the protection of nitrogen ($N_2$), 11.50 g of a dimer diamine (Priamine 1074, Croda International Plc) was dissolved with 51.25 g of N-methylpyrrolidone in a single-necked flask equipped with a magnetic stirrer and a water separation device, to which 10.46 g of 4,4'-(4,4'-isopropylidenediphenoxy)bis(phthalic anhydride) (BPADA) was slowly added. The reaction mixture was reacted at room temperature for 1 h, and then reacted at 140 °C for 10 h to obtain a primary amine-capped flexible polyimide oligomer solution. After cooled, the single-necked flask was added with 0.095 g of phenol, 0.06 g of paraformaldehyde and 0.36 g of toluene, and the water separation device was replaced with a condenser. The reaction mixture was heated to 90 °C and refluxed for 6 h. After the reaction was completed, a yellow transparent liquid with 30% solid content was collected as the benzoxazine resin Comparative Example 1

Provided herein was a method for preparing the benzoxazine resin. Specifically, under the protection of nitrogen ($N_2$), 4.01 g of 4,4'-diaminodiphenyl ether was dissolved with 33.77 g of N-methylpyrrolidone in a single-necked flask equipped with a magnetic stirrer and a water separation device, to which 10.46 g of 4,4'-(4,4'-isopropylidenediphenoxy)bis(phthalic anhydride) (BPADA) was slowly added. The reaction mixture was reacted at room temperature for 1 h, and then reacted at 140 °C for 10 h to obtain a flexible polyimide oligomer solution with 30% solid content.

The composition of Examples 4-7 and Comparative Example 1 was shown in Table 1.

TABLE 1

Composition of Examples 4-7 and Comparative Example 1

| | Example 4 | Example 5 | Example 6 | Example 7 | Comparative Example 1 |
|---|---|---|---|---|---|
| D400 | 8.40 g | 6.80 g | / | / | / |
| D230 | / | / | 4.83 g | / | / |
| ODA | / | 0.80 g | / | / | 4.01 g |
| 1074 | / | / | / | 11.50 g | / |
| BPADA | 10.46 g | 10.46 g | 10.46 g | 10.46 g | 10.46 g |
| Phenol | 0.095 g | 0.095 g | 0.095 g | 0.095 g | / |
| Paraformaldehyde | 0.06 g | 0.06 g | 0.06 g | 0.06 g | / |
| N-methylpyrrolidone | 44.01 g | 42.15 g | 35.68 g | 51.25 g | 33.77 g |
| Toluene | 0.36 g | 0.36 g | 0.36 g | 0.36 g | 0.36 g |

Example 8

Provided herein was a method for fabricating a single-side copper clad plate. Specifically, adhesive solutions respectively prepared from the benzoxazine resins prepared in Examples 4-7 and Comparative Example 1 were respectively spread onto a PI substrate which had been treated by corona. Then the PI substrate was subjected to lamination with a copper foil and curing to fabricate a single-side copper clad plate. The side of the copper clad plate coated with the adhesive is subjected to lamination and curing to prepare a multilayer substrate. Performances of the single-side copper clad plate were tested as follows.

1. Test of Peel Strength

In accordance with the IPC-TM-650-2.4.8 test specifications, the sample was cut into 3.18 mm strips, and then the testing machine is started to apply a vertical tension at a speed of 50 mm/min until the peel length reached at least 25.4 mm. The test was performed four times, and the results were averaged. The testing machine was an electronic universal testing machine.

2. Test of Soldering Resistance

The single-side copper clad plate was cut into 50 mm×50 m strips according to IPC-TM-650-2.4.13 test specifications, and tested for the soldering resistance.

3. Test of Dielectric Property

The benzoxazine resins prepared in Examples 4-7 and Comparative Example 1 were respectively coated onto polytetrafluoroethylene (PTFE) (with a thickness of 50 μm after curing), cured at 220 °C and peeled to obtain a test sample with a thickness of about 50 μm. The test sample was tested for the dielectric constant and dielectric loss tangent at 10 GHz by using a commercially available dielectric constant test device (cavity resonator type, made by AET) according to the IPC-TM-650-2.5.5.10 specifications.

4. Dynamic Mechanical Analysis (DMA)

The equipment was DMA850 (TA Instruments), and the test was performed under a tensile mode.

In the peel strength test, soldering resistance test, dielectric property test and DMA, the copper-clad laminates fabricated based on the benzoxazine resins prepared in Examples 4-7 were respectively named as Example 4-1, Example 5-1, Example 6-1, and Example 7-1, and the copper-clad laminate fabricated based on the benzoxazine resin prepared in Comparative Example 1 was named as Comparative Example 1-1.

Test results of Example 4-1, Example 5-1, Example 6-1, Example 7-1 and Comparative Example 1-1 were shown in Table 2.

TABLE 2

Test results of Examples 4-1, 5-1, 6-1 and 7-1 and Comparative Example 1-1

| | Example 4-1 | Example 5-1 | Example 6-1 | Example 7-1 | Comparative Example 1-1 |
|---|---|---|---|---|---|
| Adhesion to PI (N/mm) | 1.23 | 1.15 | 1.17 | 1.32 | 0.51 |
| Adhesion to copper foil (N/mm) | 1.33 | 1.25 | 1.29 | 1.45 | 0.87 |
| Soldering resistance | OK | OK | OK | OK | NG |
| Dk (10 GHZ) | 2.79 | 2.76 | 2.84 | 2.74 | 3.14 |
| Df (10 GHZ) | 0.0025 | 0.0024 | 0.0026 | 0.0023 | 0.0030 |

FIG. 1 is an infrared spectrogram of the sample prepared in Example 4, from which it can be observed that there were imide absorption peaks at 1775 $cm^{-1}$, 1718 $cm^{-1}$ and 1370 $cm^{-1}$, and a small oxazine ring adsorption peak at 920 $cm^{-1}$, indicating the presence of an imide structure in the prepared benzoxazine resin.

Figure 2:
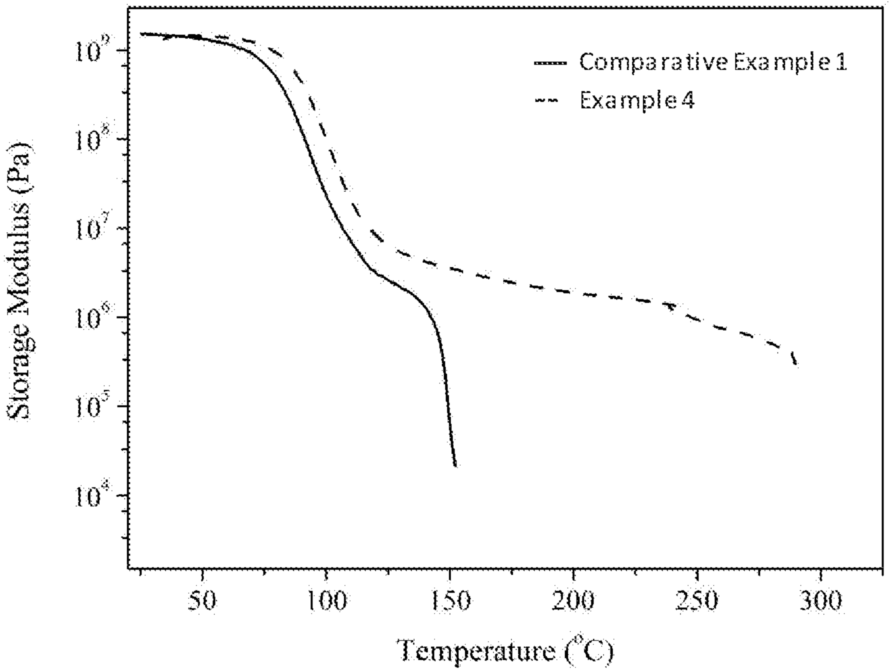
FIG. 2 schematically shows comparison between Example 4 and Comparative Example 1 in storage modulus (tested by dynamic mechanical analysis (DMA)).

FIG. 2 illustrates DMA storage modulus curves of Example 4 and Comparative Example 1 versus temperature, and it can be observed from FIG. 2 that compared to ordinary adhesives, the adhesive provided herein for copper-clad laminates with low dielectric loss has better thermal resistance.

By comparison, the adhesion and soldering resistance of Examples 4-1, 5-1, 6-1 and 7-1 are superior to those of the Comparative Example 1-1, indicating that the adhesive provided herein for copper-clad laminates with low dielectric loss has better adhesion property, and lower dielectric constant and loss.

Described above are only preferred embodiments of the present application, which are not intended to limit the present application. It should be noted that any variations, replacements and modifications made by those of ordinary skill in the art without departing from the spirit and scope of the present application shall fall within the scope of the present application defined by the appended claims.

What is claimed is:

1. A method for preparing the benzoxazine resin, comprising:

(1) preparing a primary amine-capped flexible polyimide oligomer by a process comprising:

(S1) dissolving a dibasic primary amine in a solvent under the protection of nitrogen to obtain a first mixture;

(S2) stepwise adding a tetracarboxylic acid dianhydride to the first mixture;

(S3) performing a reaction at a temperature of −20-30 °C for 0.5-24 h to obtain a second mixture; and (S4) adding a catalyst or a water-carrying agent to the second mixture followed by imidization at a second preset temperature for a second preset time, and precipitation or drying to obtain the primary amine-capped flexible polyimide oligomer; and (2) subjecting the primary amine-capped flexible polyimide oligomer, an aldehyde and a monofunctional phenolic compound to reaction to synthesize the benzoxazine resin; wherein a molecular formula of the benzoxazine resin is shown as follows:

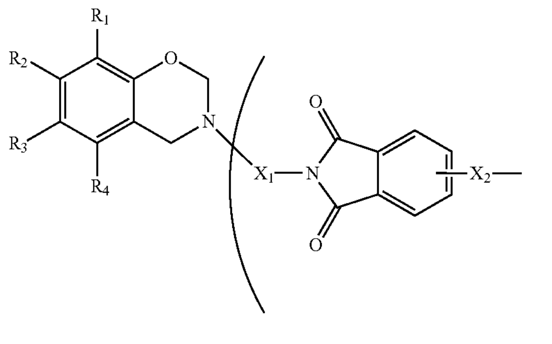

-continued

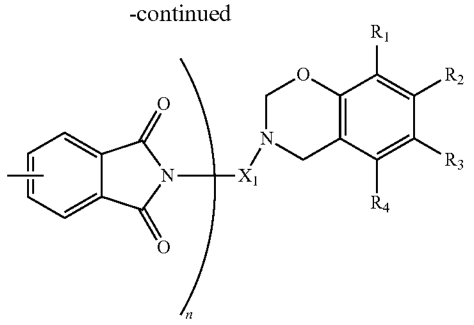

wherein R1, R2, R3 and R4 are each independently selected from the group consisting of —H, alkyl, alkoxy, cycloalkyl, and aryl, and at least one of R1, R2, R3 and R4 is —H; X1 is an alkylene or/and alkyleneoxy comprising a residue of dimer diamine; X2 is one or more selected from the group consisting of alkylene, ether group, alkyleneoxy, alkylene ester group, carbonyl, sulfone group, and thioether group; and n is 1-150.

2. The method of claim 1, wherein the aldehyde is formaldehyde, paraformaldehyde or a mixture thereof.

3. The method of claim 1, wherein a molecular formula of the monofunctional phenolic compound is shown as follows:

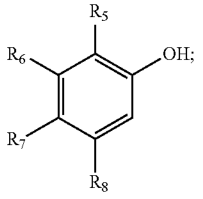

wherein R5, R6, R7 and R8 are each independently selected from the group consisting of —H, alkyl, alkoxy, cycloalkyl, and aryl, and at least one of R5, R6, R7 and R8 is —H.

4. The method of claim 3, wherein the number of carbon atoms in the alkyl and the cycloalkyl of R5, R6, R7 and R8 is 1-10.

5. The method of claim 1, wherein a molar ratio of the primary amine-capped flexible polyimide oligomer to the aldehyde to the monofunctional phenolic compound is (0.8-1.2):(1.6-2.5):(0.9-1.3).

6. The method of claim 1, wherein the solvent in step (S1) is selected from the group consisting of toluene, xylene, dioxane, tetrahydrofuran, methanol, ethanol, acetone, butanone, cyclohexanone, N,N-dimethylformamide, N,N-dimethylacetamide, N-methylpyrrolidone and a combination thereof.

7. The method of claim 4, wherein the reaction in step (2) is performed at 60-180 °C for 0.5-10 h.

8. The method of claim 1, wherein a molar ratio of the dibasic primary amine to the tetracarboxylic acid dianhydride is greater than or equal to 1 and less than 1.1.

9. The method of claim 1, wherein the tetracarboxylic acid dianhydride is selected from the group consisting of 4,4'-oxydiphthalic anhydride, 3,3',4,4'-benzophenonetetracarboxylic dianhydride, 4,4'-(4,4'-isopropylidenediphenoxy) bis (phthalic anhydride) and a combination thereof.

10. The method of claim 1, wherein the primary amine-capped flexible polyimide oligomer has a number-average molecular weight of 1,000-100,000.

11. The method of claim 1, wherein in step (S4), the second preset temperature is 20 °C, and the second preset time is 15 hours.

* * * * *